R. B. SWANK.
FLYING MACHINE.
APPLICATION FILED JUNE 1, 1911.
1,020,628.
Patented Mar. 19, 1912.
6 SHEETS—SHEET 1.
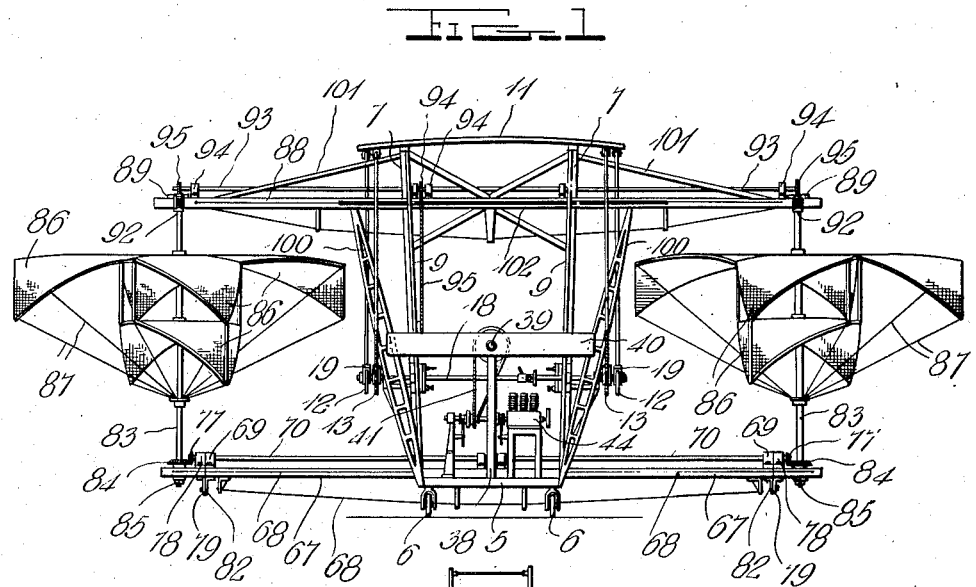
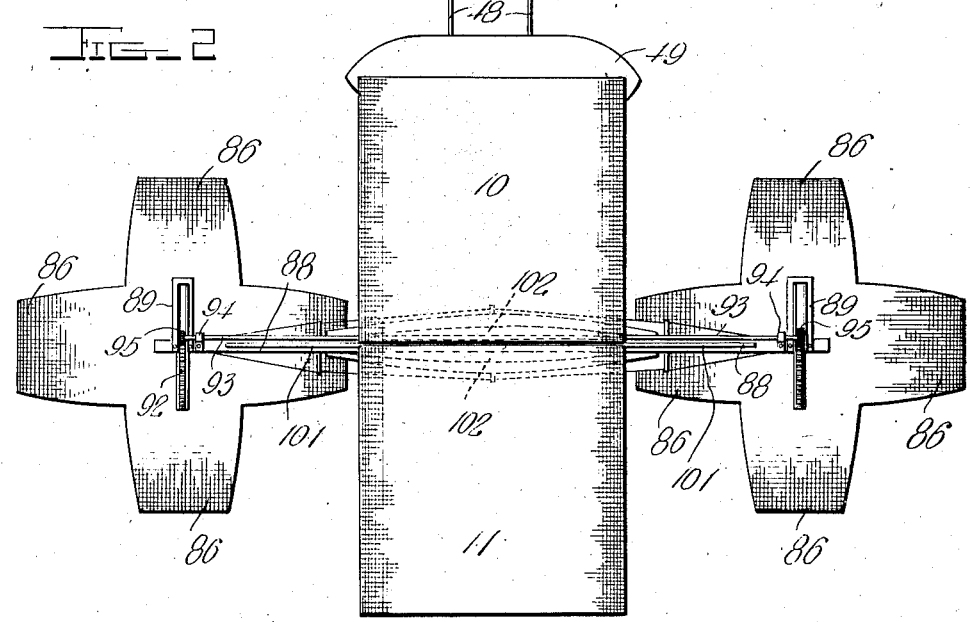
Witnesses
Inventor
Reuben B. Swank
Attorneys

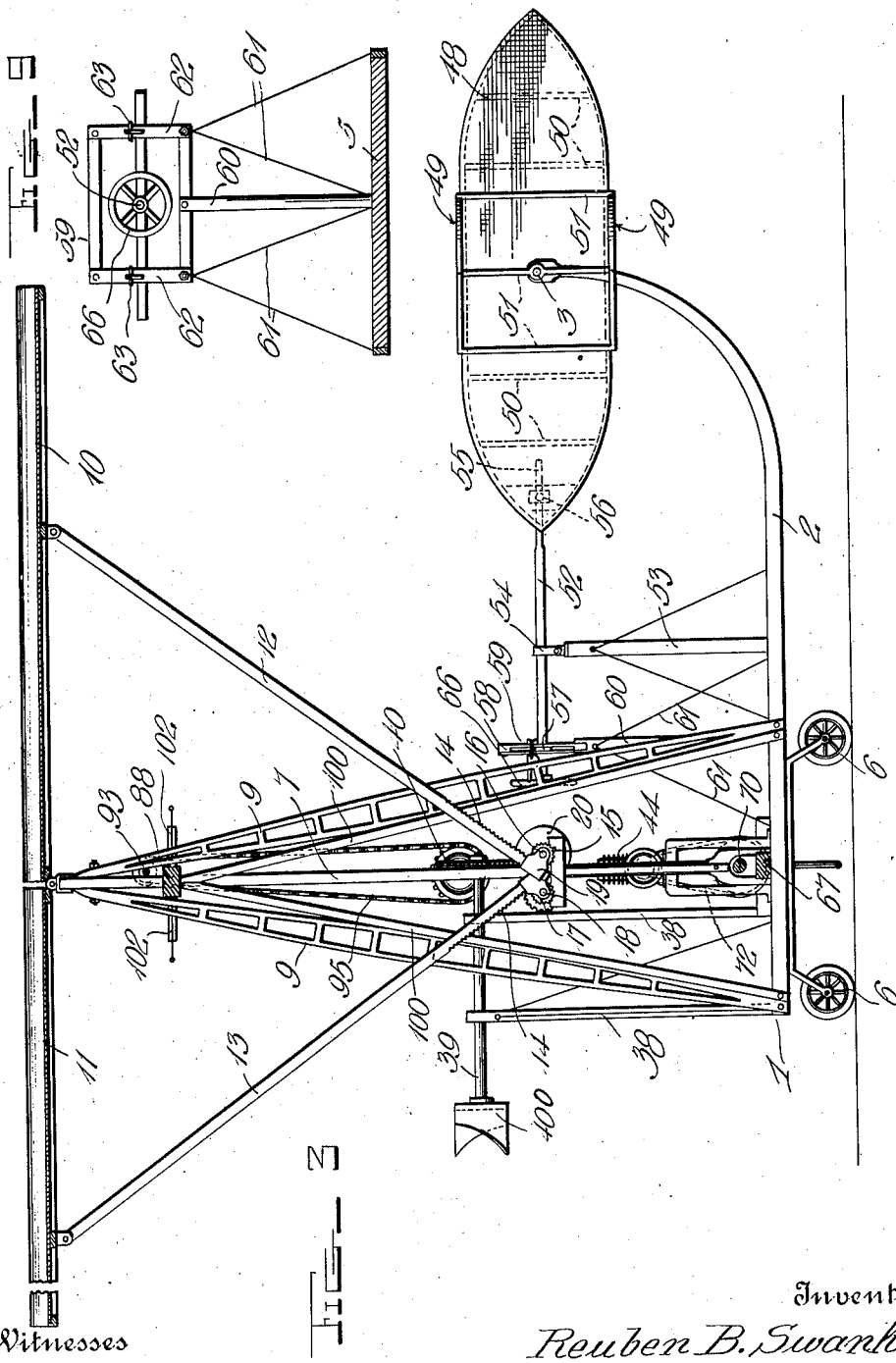

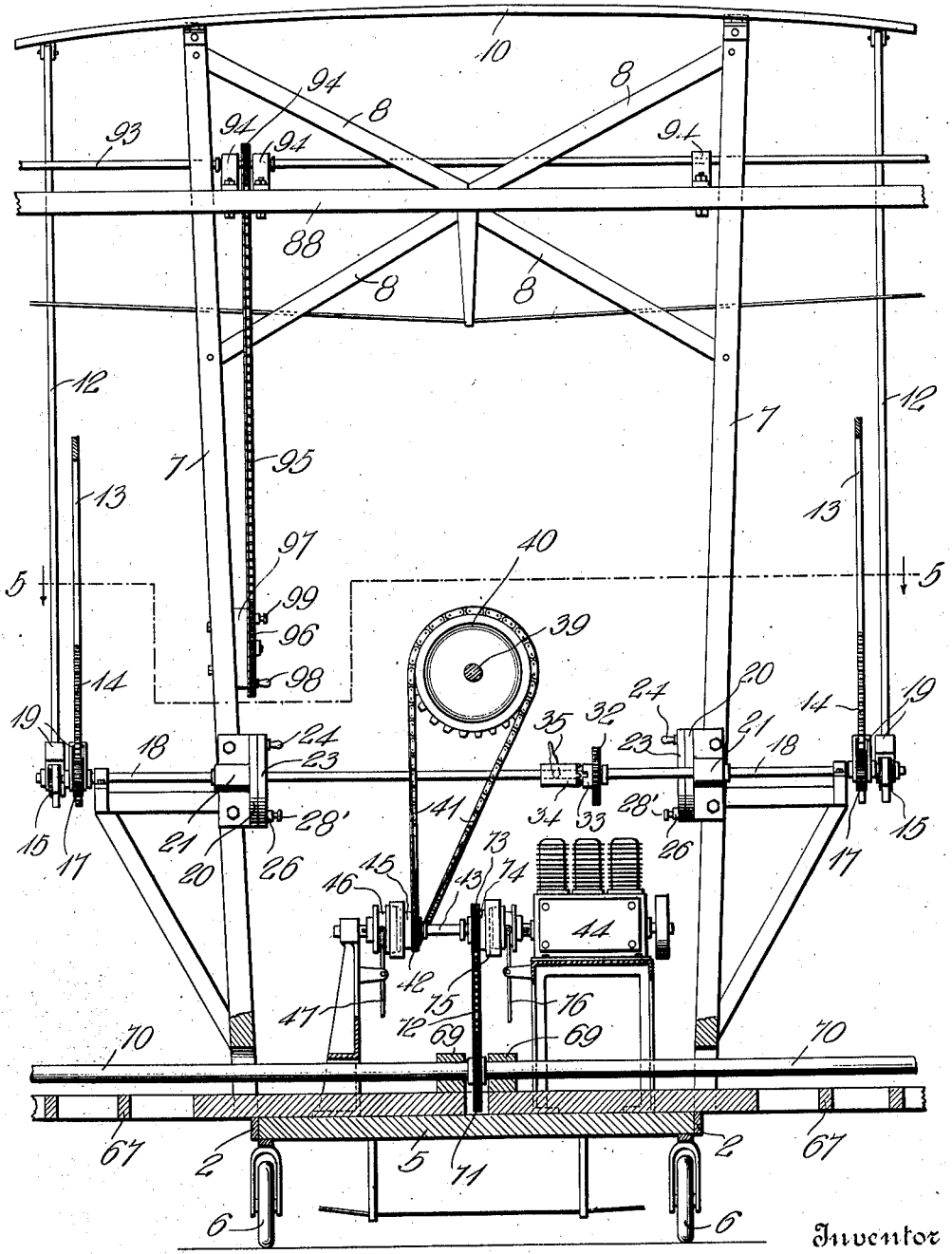

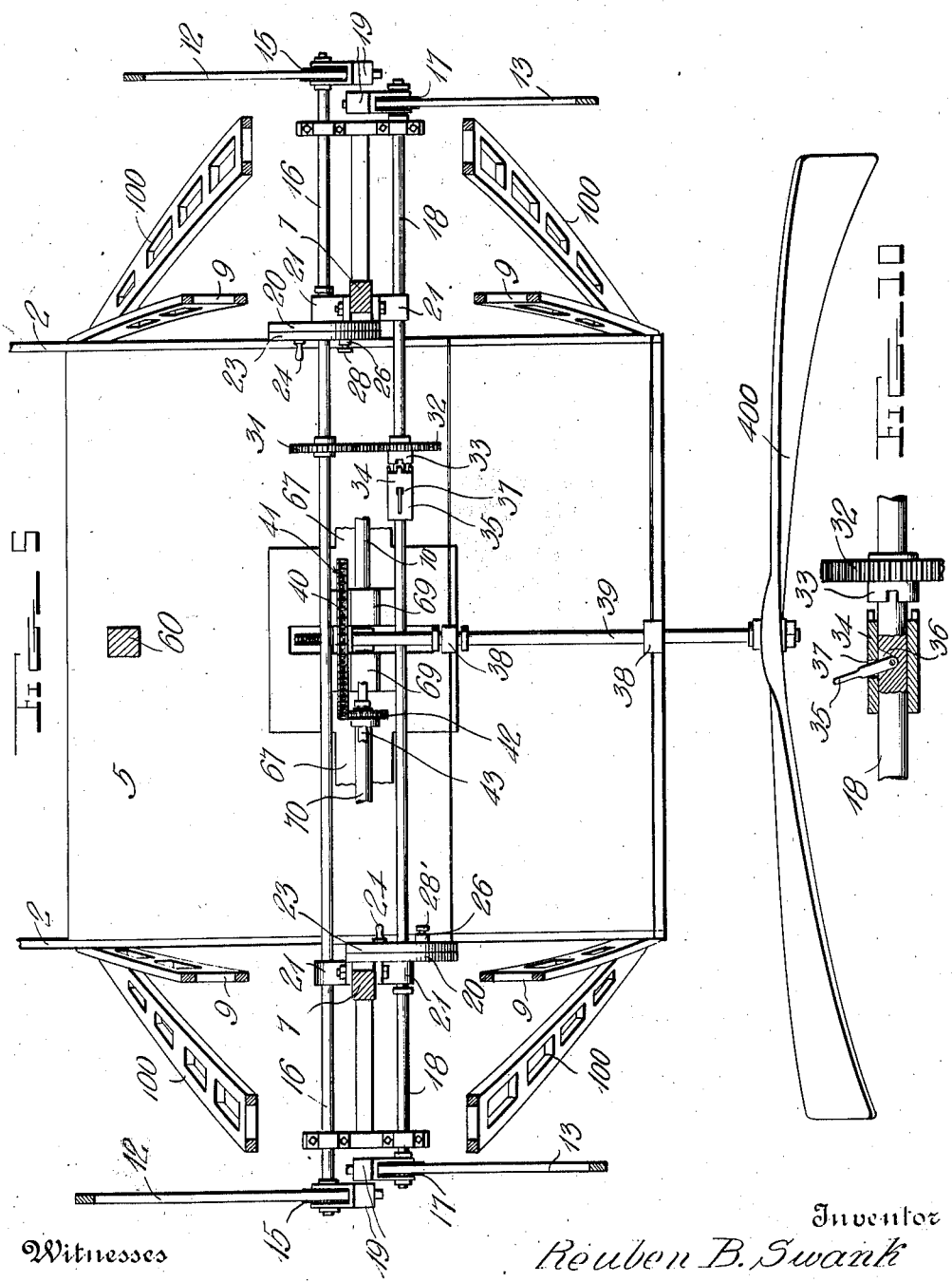

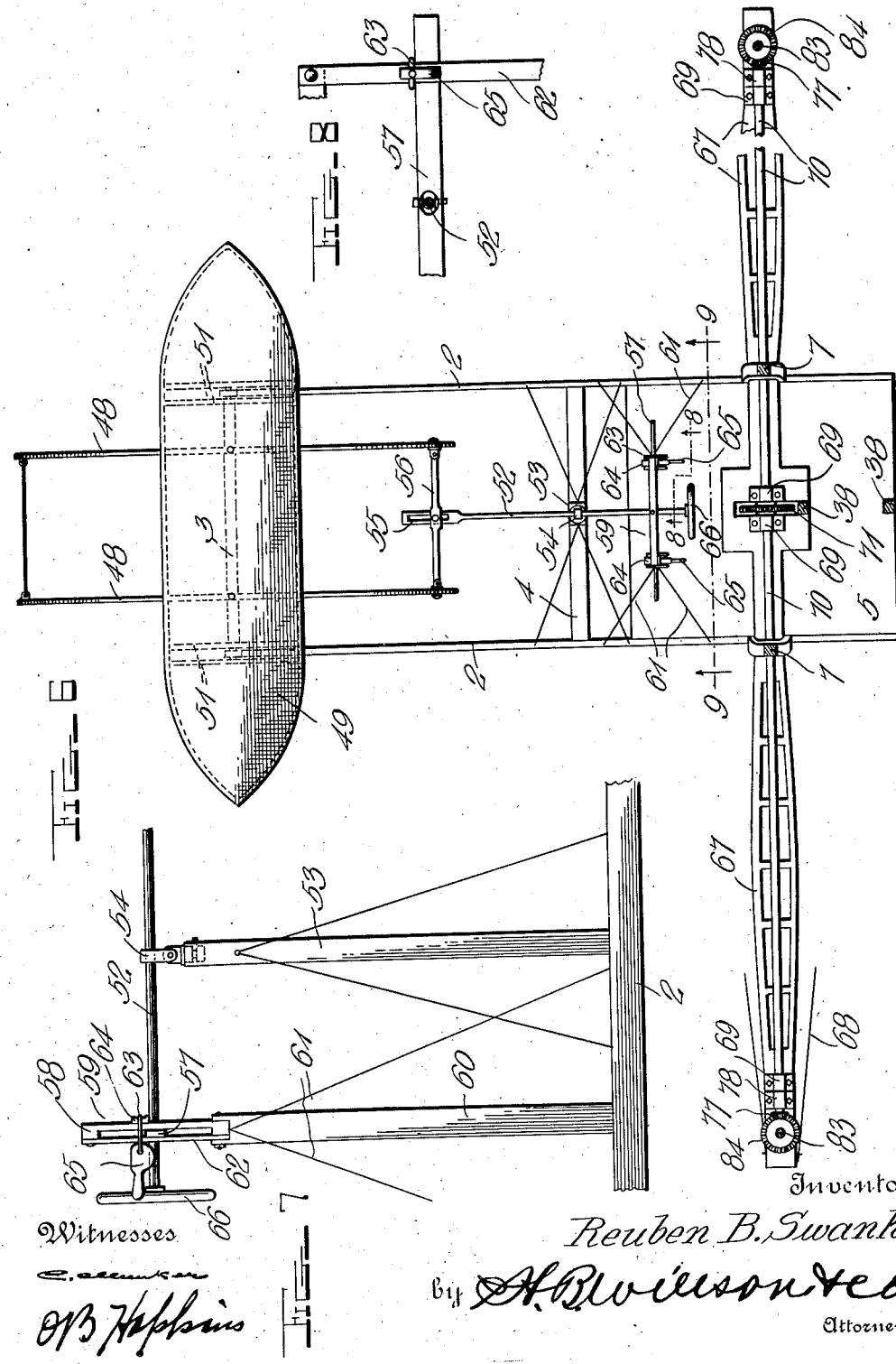

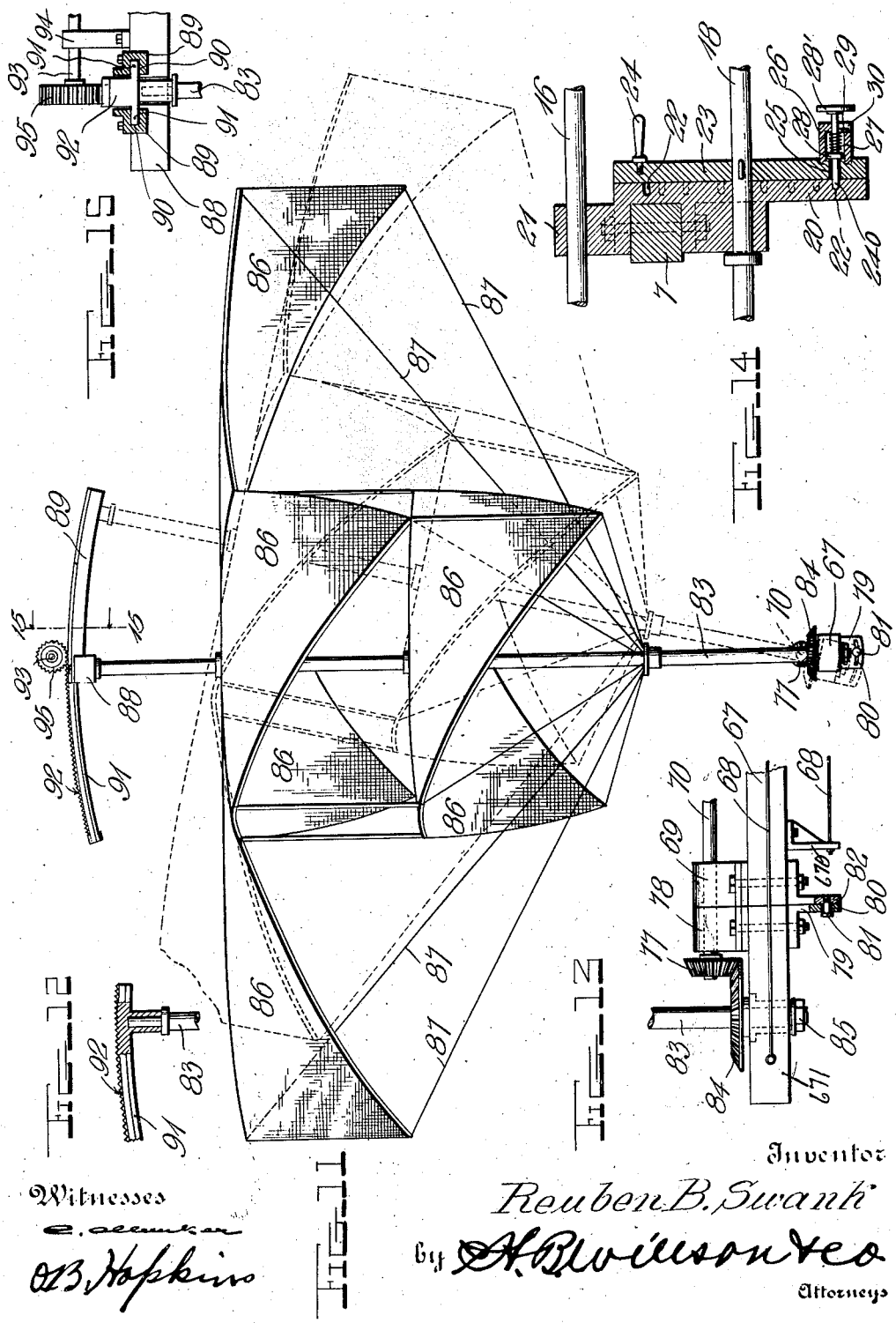

UNITED STATES PATENT OFFICE.

REUBEN B. SWANK, OF DAYTON, OHIO.

FLYING-MACHINE.

1,020,628.   Specification of Letters Patent.   Patented Mar. 19, 1912.

Application filed June 1, 1911. Serial No. 630,671.

*To all whom it may concern:*

Be it known that I, REUBEN B. SWANK, a citizen of the United States, residing at Dayton, in the county of Montgomery and State of Ohio, have invented certain new and useful Improvements in Flying-Machines; and I do declare the following to be a full, clear, and exact description of the invention, such as will enable others skilled in the art to which it appertains to make and use the same.

This invention relates to improvements in flying machines.

One object of the invention is to provide a flying machine having an improved construction and arrangement of supporting planes whereby the machine may be maintained in a horizontal position during flight, means being provided whereby said planes may be independently adjusted to direct the machine upwardly or downwardly or adjusted in unison to form a parachute whereby the machine may be lowered without danger should the working parts of the same become disabled.

Another object is to provide a flying machine having an improved construction and arrangement of rotary lifting planes by means of which the machine may be quickly elevated straight up, said planes having means whereby the same may be tilted forwardly to assist in propelling the machine in a forward direction.

A further object is to provide an improved construction and arrangement of steering mechanism whereby the machine may be perfectly controlled by the aviator.

With these and other objects in view, the invention consists of certain novel features of construction, combination and arrangement of parts as will be more fully described and particularly pointed out in the appended claims.

In the accompanying drawings: Figure 1 is a rear end view of my improved airship; Fig. 2 is a top plan view thereof; Fig. 3 is a side elevation with parts broken away and in section; Fig. 4 is a vertical cross sectional view on an enlarged scale through the center of the machine; Fig. 5 is a horizontal sectional view on the line 5—5 of Fig. 4; Fig. 6 is a horizontal sectional view taken immediately above the driving shafts of the rotary lifting planes; Fig. 7 is a detail side view of the inner portion of the steering mechanism; Fig. 8 is a detail fragmentary sectional view of the rear portion of the steering mechanism on the line 8—8 of Fig. 6; Fig. 9 is a similar view on the line 9—9 of Fig. 6; Fig. 10 is a detail vertical sectional view of the clutch mechanism for throwing the connecting gears of the horizontal plane operating shafts into and out of operation whereby said planes may be operated independently or in unison; Fig. 11 is an enlarged detail side view of one of the rotary lifting planes; Fig. 12 is a detail sectional view of the upper end of the supporting and operating shaft of one of the rotary lifting planes; Fig. 13 is a detail fragmentary side view of the outer end of one of the lower supporting members of the rotary lifting planes and the supporting and operating shafts of said planes; Fig. 14 is a sectional view of one of the locking devices for holding the horizontal sustaining planes in their adjusted position; Fig. 15 is an enlarged detail cross sectional view through the adjusting mechanism for the upper ends of the rotary plane supporting shafts taken on the line 15—15 of Fig. 11.

Referring more particularly to the drawings, 1 denotes the main supporting frame of the machine, said frame comprising longitudinally disposed side bars 2 which are curved upwardly at their forward ends and are connected together at said ends by the shaft 3 of a steering mechanism hereinafter described. The bars 2 are connected together at their rear ends by a cross bar 4 and have arranged between their rear ends a platform 5. The rear portion of the frame 1 is preferably provided with pairs of supporting wheels 6 whereby the machine is adapted to travel on the ground.

Secured to the side bars of the frame are upwardly projecting plane supporting bars 7 which are connected together at their upper ends by crossed braces 8 and are braced by suitable inclined trussed brace bars 9. To the upper ends of the bars 7 are hingedly connected the inner ends of front and rear sustaining planes 10 and 11 which may be of any suitable construction, but which are preferably in the form of fabric covered frames. The planes 10 and 11 are adjustably supported at their outer ends by pairs of inclined supporting bars 12 and 13 Fig. 3 having on the outer edges of their lower ends rack teeth 14. The toothed lower ends of the bars 12 are engaged with spur gears 15 on the opposite ends of a plane operating shaft 16 whereby the plane 10 may be raised or lowered. The lower ends of the bars 13 are engaged with gears 17 fixed on the outer end of a plane operating shaft 18 by means of which the plane 11 is raised and lowered. The lower ends of the bars 12 and 13 are held in operative engagement with the gears 15 and 17 by suitable guide casings 19 pivotally mounted on the ends of the shafts 16 and 18 as shown.

The shafts 16 and 18 are each provided with means for turning the same in the desired direction for adjusting the planes operated thereby and for locking the same against movement whereby said planes are secured in their adjusted position. The operating and locking means for said shafts comprise stationary disks or plates 20 which are preferably formed integral with the bearings 21 of the shaft and are rigidly secured to the supporting bars 7 of the planes. In the the inner sides of the disks or plates 20 are annular series of locking notches or recesses 22. Keyed or otherwise fixedly secured to the shafts 16 and 18 adjacent to and adapted to coact with the disks 20 are crank disks or plates 23 to which are secured laterally extending crank handles 24 whereby said disks and the shaft to which they are secured may be turned in the desired direction. Also arranged on the disks 23 are locking pins 240, Fig. 14, the inner ends of which are loosely engaged with transverse passages 25 formed in the disks 23. The outer portions of the pins 240 are slidably engaged with casings 26 and have arranged thereon in said casings, pin projecting springs 27 the outer end of which engage the outer ends of the casing and the opposite ends engage stop collars 28 arranged on the pin as shown. On the outer ends of the pins are arranged operating heads or handles 28' and said pins are also preferably provided with laterally extending fingers 29, which, when the pins are in operative engagement with the recesses 22 of the disks 20, are engaged with notches 30 in the outer ends of the casings and which, when said pins are retracted and turned, are engaged with the outer ends of the casings thereby holding said pins in retracted or inoperative position. When the pins 240 are thus retracted the disks 23 and the shafts to which the same are attached may be turned in the desired direction for adjusting the plane connected therewith.

In order to permit both of the shafts 16 and 18, and the planes connected thereto to be operated in unison, I preferably provide the shaft 16 with a fixed spur gear 31 and the shaft 18 with a loosely mounted gear 32, said gears being in operative engagement. The loose gear 32 is provided with one member 33 of a clutch the other member 34 of which is slidably secured to the shaft 18 and is adapted to be shifted into engagement with the clutch member 33 to lock the gear 32 to the shaft 18 by means of a short shifting lever 35 which is pivotally secured at its inner end in a V-shaped notch 36 formed in the shaft 18 and projects up through a slot 37 formed in the clutch member 34 as clearly shown in Figs. 5 and 10 of the drawings. When the clutch member 34 is shifted to lock the gear 32 to the shaft 18 the shafts 16 and 18 will be operatively connected together by the gears 31 and 32 so that when either of the shafts are turned by the operating disks hereinbefore described, the other shaft will be simultaneously operated in the opposite direction thus raising or lowering the planes in unison.

Revolubly mounted in suitable bearing standards 38 secured to the platform 5 is a propeller shaft 39 having on its rear end a propeller blade 400. Fixed on the inner end of the shaft 39 is a sprocket gear 40 which is connected by a sprocket chain 41 to a sprocket gear 42 loosely mounted on the drive shaft 43 of a suitable motor 44 arranged on the platform 5 as shown. The sprocket gear 42 is fixed on or forms part of a friction clutch member 45 the opposing member 46 of which is slidably keyed to the shaft 43 and is adapted to be shifted by the lever 47 to engage the same with the clutch member 45 of the sprocket gear 42 whereby said gear is locked to the shaft 43 and the movement of said shaft thus imparted to the propeller through the chain 41 and sprocket gear 40.

On the shaft 3 which connects the front ends of the bars 2 of the frame are a pair of vertically disposed steering planes 48 which are disposed between the central portion of a pair of horizontally disposed steering planes 49. The planes 48 and 49 are preferably in the form of fabric covered frames and the frames of each pair of planes are connected together and spaced apart by suitable cross bars 50 and 51 whereby said planes are braced and firmly secured to the shaft 3. The planes 48 and 49 are adjusted to control the direction of the machine by means of an operating bar or shaft 52 which is pivotally secured intermediate its ends on a supporting standard 53 by a universal joint connection 54 whereby said bar or shaft may be swung in a vertical or horizontal plane. The outer end of the bar or shaft 52 is provided with a slotted head 55 whereby said end of the shaft has a loose sliding connection with a cross bar 56 connecting the rear ends of the planes 48 as clearly shown in Fig. 6 of the drawings.

To the rear end of the bar or shaft 52 is loosely connected a horizontal transversely disposed plane securing bar 57 Figs. 3, 6, 7 and 8 the opposite ends of which are slidably engaged with the recessed end bars 58 of a supporting frame 59 secured to the upper end of a supporting standard 60 arranged on the forward end of the platform 5. The frame 59 is further held by suitable brace rods 61 secured thereto and to the platform 5 as shown. The bar 57 when thus arranged is adapted to be moved up and down or laterally in either direction with the movement of the bar or shaft 52 and is adapted to be secured when thus moved to fasten the shaft or bar 52 in its adjusted positions for holding the planes 48 and 49 at the desired angle by spring clamping plates 62 secured at their upper and lower ends to the upper and lower ends of the recessed bars 58 with which the transverse bar 57 is engaged, said plates 62 thus inclosing the ends of the bar 57 in the recesses of the bars 58. In order to fasten the ends of the bar 57 in the recesses of the bars 58 I provide clamping devices comprising clamping bands or rings 63 which will encircle the bars 58 and the plates 62 and are engaged at their inner ends with clamping blocks 64 which are slidably engaged with the inner sides of the bar 58 and at their outer ends engage cam levers 65 which are adapted to be turned on the outer ends of the links or band to bring the cam surfaces thereof into operative engagement with the spring plates 62 whereby the latter are clamped into tight engagement with the ends of the bar 57 thus firmly securing said bar in the position to which it has been moved by the plane adjusting bar 52. By thus fastening the bar 57 the plane adjusting bar 52 and the steering planes 48 and 49 will be securely locked in their adjusted position. The inner end of the bar 52 is provided with a suitable operating handle which is here shown in the form of a wheel 66 whereby said bar may be rocked vertically to tilt both pairs of planes 48 and 49 in a vertical direction whereby the machine is directed upwardly or downwardly or to swing said bar laterally to adjust the planes 48 in a horizontal plane whereby the machine may be steered to the right or left.

Secured to the platform and frame of the machine is a lower horizontal transversely disposed plane supporting bar 67 Fig. 6 the ends of which are preferably constructed in skeleton form and project a suitable distance beyond the opposite sides of the machine. The outwardly extending ends of the bar 67 are provided with depending brackets 670 and the bar is preferably braced by suitable rods 68 secured to said brackets as shown. On the bar 67 near the center thereof and at its outer ends are secured bearings 69 in which is revolubly mounted a plane operating shaft 70 having fixed thereon midway between its ends and between the inner bearings 69 a sprocket gear 71 which works through a slot in the bearing 69 and is connected by a sprocket chain 72 Fig. 4 with a sprocket gear 73 loosely mounted on the shaft 43 of the engine. The gear 73 has formed on one side one member 74 of a clutch, the opposing member 75 of which is slidably keyed to the engine shaft 43 and is adapted to be shifted into engagement with the clutch member 74 by a suitable clutch shifting lever 76 arranged as shown. On the outer ends of the shaft 70 are fixed bevel gear pinions 77 the purpose of which will be hereinafter described.

Pivotally supported on the outer ends of the shaft 70 are short bearings 78 to the lower sides of which are secured extension bars 671 which are provided with depending angle brackets 79 in which are formed segmental slots 80. With the slots 80 are engaged stop pins 81 secured in angle brackets 82 bolted to the under side of the outer ends of the bar 67 whereby the pivotal or swinging movement of the bearings 78 and extension bars 671 on the shaft 70 is limited. Revolubly mounted in the extension bars 671 at the outer ends of the bar 67 are upwardly extending rotary plane supporting and operating shafts 83 on the lower ends of which are fixed bevel gears 84 which are engaged with the bevel gear pinions 77 on the ends of the shaft 70 whereby the movement of said shaft 70 is imparted to the shafts 83.

The lower ends of the shafts 83 are preferably threaded and have screwed thereon retaining nuts 85 whereby the shafts 83 are held in operative engagement with the extension bars 671. On the shafts 83 are secured a series of radially extending planes or blades 86 the outer ends of which are turned down at a suitable angle for engaging the air when the shafts 83 and planes are revolved in the proper direction. The planes or blades 86 are preferably arranged in series one above the other on the shafts 83 and any number or series of planes may be provided, two series being shown in the present instance. The upper plane is here shown and is preferably provided with four blades or wings, while the lower plane is shown as having but two blades or wings. The outer ends of the blades or wings of the lower plane are connected to the ends of the adjacent blades or wings of the upper plane and the ends of the blades of both planes are connected to the shaft 83 by a series of bracing cords or rods 87.

Secured to the plane supporting bars or standards near their upper ends is a horizontal transversely disposed plane supporting bar 88 the outer ends of which project beyond the sides of the machine to a point above the upper ends of the shafts 83 of the rotary planes as shown. Fixed to the outer ends of the bar 88 are segmental guide frames 89 having formed in their inner edges guide grooves 90 with which are slidably engaged laterally projecting guide flanges 91 formed on segmental rack bars 92 with which the upper ends of the shafts 83 of the rotary planes are pivotally engaged as clearly shown in Figs. 12 and 15 of the drawings. By thus connecting the upper ends of the shafts 83 they, together with the rotary planes thereon may be rocked on the ends of the shaft 70 to bring said planes in the position shown in dotted lines in Fig. 11 whereby the planes are adapted to assist in propelling the machine.

In order to shift the rack bars 92 and shafts 83 to bring the rotary planes to the desired positions, I provide a suitable shifting mechanism, Figs. 1, 4 and 6 comprising a transversely disposed shaft 93 which is revolubly mounted in suitable bearings 94 arranged on the bar 88 as shown. On the outer ends of the shaft 93 are fixed spur gear pinions 95 which are adapted to engage the teeth of the rack bars 92 whereby, when said shaft is revolved in one direction or the other, the rack will be shifted and the shafts 83 of the rotary planes thus adjusted to the desired position. Fixedly mounted at a suitable point on the shaft 93 is a sprocket gear 94 which is connected by a sprocket chain 95 to a similar gear 96 which is revolubly mounted on a bearing block 97 secured to one of the bars or standards 7 as shown in Fig. 4 of the drawings. Secured to one side of the sprocket gear 96 is a crank handle 98 whereby the gear may be turned to operate the shaft 93 and the pinions thereon by which the rotary planes are tilted as hereinbefore described. In order to secure the rotary planes in their adjusted positions I provide the gear 96 with a suitable locking mechanism comprising a spring projected locking pin 99 which is adapted to be projected through a passage in the gear and into engagement with one of the series of locking recesses formed in the block 97 in the same manner as shown and described in Fig. 14 of the drawing and described in connection with the locking mechanism for holding the horizontal planes in their adjusted position.

The bar 88 is suitably braced by inclined trussed brace bars 100 which are connected at their lower ends to the side bars 2 of the main frame and at their upper ends to the lower side of the bar 88 as clearly shown in Figs. 1 and 3 of the drawings. The bar 88 is further braced by inclined brace bars 101 secured thereto and to the upper ends of the bars or standards 7 and is further strengthened and made more rigid by trussed brace rods 102 connected thereto as shown.

It will be noticed that the blades of the rotary planes are arranged at a considerable distance above the platform or lower portion of the main frame of the machine whereby the weight of said platform and the parts supported thereon serve as a pendulum for maintaining the center of gravity and keeping the machine in an upright position. The rotary planes also impart stability to the machine and materially aid in keeping the machine in a horizontal position and preventing the same from upsetting in a storm, thus overcoming one of the principal objections and dangers of other forms of air ships now in use.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. A main frame, a pair of planes pivoted at their inner edges to the main frame, a pair of shafts journaled in the main frame parallel with the pivots of the planes, a gear on each of said parallel shafts, a rack bar pivoted to each plane and engaging one of said gears, and means for rotating the shafts to longitudinally move the rack bars to adjust the planes on their pivots.

2. In a flying machine, a main supporting frame, a pair of plane supporting standards secured to and projecting upwardly above said frame, means to connect and brace the upper ends of said standards, horizontal sustaining planes hingedly connected at their inner ends to said standards, operating bars pivotally connected at their upper ends to said planes, rack teeth formed on the lower ends of said bars, a pair of plane adjusting shafts, revolubly mounted in suitable bearings on said standards, gears fixedly mounted on the outer ends of said shafts and adapted to engage the teeth of said plane adjusting bars whereby the latter are actuated to swing the outer ends of the planes upwardly or downwardly, means whereby said shafts are revolved to independently adjust said planes, and means to operatively connect said shafts together whereby the movement of one shaft will be imparted to the other and said shafts thus moved in unison to simultaneously adjust said planes.

3. In a flying machine, a main supporting frame, a pair of plane supporting standards secured and projecting upwardly above said frame, means to connect and brace the upper ends of said standards, horizontally sustaining planes hingedly connected at their inner ends to said standards, operating bars pivotally connected at their upper ends to said planes, rack teeth formed on the lower ends of said bars, a pair of plane adjusting shafts revolubly mounted in suitable bearings on said standards, gears fixedly mounted on the outer ends of said shafts and adapted to engage the teeth of said plane adjusting bars whereby the latter are actuated to swing the outer ends of the planes upwardly or downwardly, crank disks fixedly mounted on said shafts, stationary locking disks arranged on said shafts, said disks having formed therein annular series of recesses, handles arranged on said crank disks, spring projected locking pins carried by said disks and adapted to be engaged with the recesses in said locking disks whereby said crank disks and said shafts are locked when operated and to adjust said planes thereby holding the planes in their adjusted positions and means to hold said locking pins in a retracted or released position.

4. In a flying machine, a main supporting frame, a pair of plane supporting standards secured and projecting upwardly above said frame, means to connect and brace the upper ends of said standards, horizontal sustaining planes hingedly connected at their inner ends to said standards, operating bars pivotally connected at their upper ends to said planes, rack teeth formed on the lower ends of said bars, a pair of plane adjusting shafts, revolubly mounted in suitable bearings on said standards, gears fixedly mounted on the outer ends of said shafts and adapted to engage the teeth of said plane adjusting bars whereby the latter are actuated to swing the outer ends of the planes upwardly or downwardly, means to independently operate said shafts and thereby adjust said planes, a shaft connecting gear fixedly mounted on one of said shafts, a similar gear loosely mounted on the other shaft, and engaged with said fixed gear, a clutch mechanism adapted to lock said loose gear into engagement with its shaft whereby said shafts are geared together and adapted to move in unison, thus simultaneously adjusting said planes.

5. In a flying machine, a main supporting frame, horizontally disposed sustaining planes adjustably connected to said frame, a motor arranged on said frame, a rotary propeller operatively connected with said motor, means to throw said propeller into and out of operation, a steering mechanism, said mechanism comprising a horizontally disposed shaft, a pair of parallel vertically disposed steering planes mounted on said shaft, a pair of horizontally disposed steering planes arranged above and below said vertical planes midway between their ends, said horizontal planes being connected with and supported by said shaft, a plane operating rod having a loose sliding connection at its outer end with the rear ends of said vertical planes, a bar supporting standard, a universal joint connection between said bar and said standard, a plane securing bar loosely connected to the inner end of said operating bar, a supporting frame having recessed end bars with which the outer ends of said securing bar are slidably engaged, spring clamping plates secured to said end bars, clamps adjustably engaged with the recessed end bars of the supporting frame and with said spring clamping plates whereby the latter are actuated to clamp the ends of the plane securing bar thereby fastening said plane operating bar and steering planes in their adjusted position.

6. In a flying machine, a main supporting frame, plane supporting standards secured to said frame, trussed braces to connect the upper ends of said standards to the frame, horizontal sustaining planes hingedly connected to said standards, means whereby said planes are adjusted, a suitably operated propelling mechanism, a steering mechanism adapted to steer said machine in horizontal and vertical planes, a lower transversely disposed supporting bar having its ends projecting a suitable distance beyond the opposite sides of the main frame, a plane operating shaft revolubly mounted in suitable bearings on said bar, plane supporting plates pivotally mounted on the outer ends of said shaft and adjustably secured to the ends of said bar, rotary lifting planes having the lower ends of their shafts revolubly mounted in said plane supporting plates, gears fixedly mounted on the lower ends of said shafts, similar gears fixedly mounted on the outer ends of said plane operating shafts whereby said planes are driven, and means to adjustably support the upper ends of said rotary plane shafts whereby the latter and said planes may be adjusted to facilitate the propulsion of the machine.

7. In a flying machine, a main frame, a transverse bar supported thereon, bearings fixed on top of the outer ends of each bar, a transverse shaft parallel with the bar mounted in said bearings, extension bars loosely placed at the ends of the bar, bearings secured to said extension bars and loosely mounted on the shaft, a vertical shaft mounted in each extension bar whereby said vertical shaft and its supporting extension bar may oscillate on the parallel shaft, bevel gearing connecting each end of the parallel shaft with the lower end of one of the vertical shafts, rotary planes secured to the vertical shafts, and means for securing the vertical shafts in any position to which they may be oscillated.

8. In a flying machine, a main frame, a transverse bar supported thereon, bearings fixed on top of the outer ends of said bar, a transverse shaft parallel with the bar mounted in said bearings, extension bars loosely placed at the ends of the bar, bearings secured to said extension bars and loosely mounted on the shaft, a vertical shaft mounted in each extension bar whereby said vertical shaft and its supporting extension bar may oscillate on the parallel shaft, bevel gearing connecting each end of the parallel shaft with the lower end of one of the vertical shafts, rotary planes secured to the vertical shafts, and means for securing the vertical shafts in any position to which they may be oscillated, comprising a bracket depending from each end of the transverse bar, a similar bracket depending from the inner end of each extension bar and bearing against the adjacent bracket on the bar, one bracket of each adjacent pair having a curved slot, and a clamp screw projecting through the curved slot into the adjacent bracket.

9. In a flying machine, a main supporting frame, a pair of plane supporting standards arranged thereon, a transversely disposed plane supporting bar secured to said main frame and projecting laterally beyond the opposite sides thereof, a rotary plane operating shaft revolubly mounted on said bar, plane supporting plates pivotally mounted on the outer ends of said shaft and loosely connected to the adjacent ends of said supporting bar, a pair of rotary lifting and steadying planes, said planes comprising vertically disposed shafts having their lower ends pivotally mounted in said plates, lifting planes or blades arranged on said shaft, bevel gears fixedly mounted on the outer ends of said plane operating shaft and engaging the gears on said vertical shaft whereby the latter and said lifting planes are revolved, an upper plane supporting bar secured to the upper ends of said standards, segmental guide frames secured to the outer ends of said upper plane supporting bar, segmental rack bars having a sliding engagement with said guide frames, bearing sockets formed on said rack bars and adapted to receive and revolubly support the upper ends of said vertical lifting and steadying plane shafts, a revolubly mounted plane adjusting shaft, gears fixedly mounted on the outer ends of said shaft and adapted to engage and shift said racks in said guide frames to tilt said lifting planes forwardly whereby said planes may be employed to aid in the propulsion of the machine, a sprocket gear fixedly mounted on said adjusting shaft, a bearing block secured to one of said plane supporting standards, said block having formed therein an annular series of recesses, a sprocket gear revolubly mounted on said block, a sprocket chain to connect said gear with the sprocket gear on said plane adjusting shaft, a crank handle secured to the sprocket gear on said block, and a spring projected locking pin arranged in said gear and adapted to be engaged with one of the recesses in said block whereby said gear is locked and thus holds said lifting planes in the position to which they have been adjusted by the adjusting shaft gears.

In testimony whereof I have hereunto set my hand in presence of two subscribing witnesses.

REUBEN B. SWANK.

Witnesses:
 JOHN J. HOOVER,
 JAS. HICKMAN.